US012757147B2

(12) United States Patent
Thomas et al.

(10) Patent No.: US 12,757,147 B2
(45) Date of Patent: Oct. 6, 2026

(54) POSITIONING REFERENCE SIGNAL RESOURCE CONFIGURATION

(71) Applicant: Lenovo (Singapore) Pte. Ltd., New Tech Park (SG)

(72) Inventors: Robin Thomas, Bad Nauheim (DE); Karthikeyan Ganesan, Kronberg im Taunus (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 687 days.

(21) Appl. No.: 18/015,292

(22) PCT Filed: Jul. 9, 2021

(86) PCT No.: PCT/IB2021/056169
§ 371 (c)(1),
(2) Date: Jan. 9, 2023

(87) PCT Pub. No.: WO2022/009160
PCT Pub. Date: Jan. 13, 2022

(65) Prior Publication Data

US 2023/0269695 A1 Aug. 24, 2023

Related U.S. Application Data

(60) Provisional application No. 63/050,023, filed on Jul. 9, 2020.

(51) Int. Cl.
*H04W 64/00* (2009.01)
*H04L 5/00* (2006.01)
(Continued)

(52) U.S. Cl.
CPC ........... *H04W 64/00* (2013.01); *H04L 5/0051* (2013.01); *H04W 24/10* (2013.01); *H04W 76/28* (2018.02)

(58) Field of Classification Search
CPC .......... G01S 5/10; G01S 5/011; H04W 72/51; H04W 76/28; H04W 64/00
(Continued)

(56) References Cited

U.S. PATENT DOCUMENTS 11,558,162 B2 * 1/2023 Manolakos ........... H04W 72/51
11,792,607 B2 * 10/2023 Manolakos ........... H04L 5/0048 455/456.1
(Continued)

FOREIGN PATENT DOCUMENTS

CN 114223168 A * 3/2022 ............ H04W 72/51
CN 114501619 A * 5/2022 ........... H04L 5/0048
(Continued)

OTHER PUBLICATIONS

PCT/IB2021/056169, "Notification of Transmittal of the International Search Report and the Written Opinion of the International Searching Authority, or the Declaration", International Searching Authority, Oct. 14, 2021, pp. 1-12.
(Continued)

*Primary Examiner* — William D Cumming
(74) *Attorney, Agent, or Firm* — Kunzler Needham Hilton

(57) ABSTRACT

Apparatuses, methods, and systems are used for transmitting and/or receiving a positioning reference signal resource configuration. One method includes receiving, at a location server, a discontinuous reception configuration of at least one user equipment. The method includes transmitting a positioning reference signal resource configuration to the at least one user equipment based on the discontinuous reception configuration. The at least one user equipment uses the positioning reference signal resource configuration and the discontinuous reception configuration to perform positioning reference signal measurements.

20 Claims, 8 Drawing Sheets

(51) Int. Cl.
*H04W 24/10* (2009.01)
*H04W 76/28* (2018.01)

(58) Field of Classification Search
USPC ............................... 455/456.1; 370/311, 329
See application file for complete search history.

(56) References Cited

U.S. PATENT DOCUMENTS

| | | | | |
|---|---|---|---|---|
| 11,856,576 | B2 * | 12/2023 | Cha | H04J 13/0029 |
| 11,916,836 | B2 * | 2/2024 | Manolakos | H04W 64/00 |
| 12,289,703 | B2 * | 4/2025 | Bao | H04W 64/00 |
| 2012/0264449 | A1 * | 10/2012 | Kazmi | G01S 5/011<br>455/456.1 |
| 2015/0271852 | A1 * | 9/2015 | Rahman | H04L 5/001<br>370/329 |
| 2019/0327673 | A1 * | 10/2019 | Bitra | G01S 5/10 |
| 2021/0050978 | A1 * | 2/2021 | Manolakos | H04L 5/0051 |
| 2022/0030390 | A1 * | 1/2022 | Manolakos | H04L 5/0048 |
| 2022/0039135 | A1 * | 2/2022 | Manolakos | H04L 5/0048 |
| 2022/0225462 | A1 * | 7/2022 | Manolakos | H04W 24/10 |
| 2022/0272731 | A1 * | 8/2022 | Cha | H04W 76/28 |
| 2023/0102893 | A1 * | 3/2023 | Bao | H04W 64/00<br>455/456.1 |
| 2023/0103460 | A1 * | 4/2023 | Manolakos | H04W 64/00<br>370/311 |
| 2023/0269695 | A1 * | 8/2023 | Thomas | H04L 5/0051<br>455/456.1 |
| 2024/0171346 | A1 * | 5/2024 | Manolakos | H04L 5/0048 |
| 2024/0319309 | A1 * | 9/2024 | Bao | G01S 5/0036 |
| 2024/0406923 | A1 * | 12/2024 | Shreevastav | H04L 5/0051 |

FOREIGN PATENT DOCUMENTS

| | | | | | |
|---|---|---|---|---|---|
| CN | 114501619 | B | * | 6/2022 | H04L 5/0048 |
| CN | 115769538 | A | * | 3/2023 | G01S 5/0236 |
| CN | 116941255 | A | * | 10/2023 | H04L 5/00 |
| CN | 117136524 | A | * | 11/2023 | H04L 5/00 |
| CN | 117242363 | A | * | 12/2023 | G01S 5/0036 |
| CN | 114223168 | B | * | 4/2024 | H04W 72/51 |
| CN | 115150909 | B | * | 4/2024 | H04W 36/0011 |
| CN | 118318458 | A | * | 7/2024 | H04W 8/24 |
| CN | 118353591 | A | * | 7/2024 | H04W 72/51 |
| EP | 2797347 | A1 | | 10/2014 | |
| EP | 4014608 | B1 | * | 1/2025 | H04W 72/51 |
| EP | 4496391 | A2 | * | 1/2025 | H04W 72/51 |
| JP | 2024512301 | A | * | 3/2024 | G01S 5/0036 |
| JP | 7806072 | B2 | * | 1/2026 | G01S 5/0205 |
| TW | 202107919 | A | * | 2/2021 | H04W 72/51 |
| TW | 202429925 | A | * | 7/2024 | H04W 72/51 |
| TW | I853938 | B | * | 9/2024 | H04W 72/51 |
| WO | WO-2020222614 | A1 | * | 11/2020 | H04J 13/0025 |
| WO | WO-2021029934 | A1 | * | 2/2021 | H04W 72/51 |
| WO | 2021154848 | A1 | | 8/2021 | |
| WO | WO-2022009160 | A1 | * | 1/2022 | G01S 5/0236 |
| WO | WO-2022020036 | A1 | * | 1/2022 | H04B 1/713 |
| WO | WO-2022192823 | A1 | * | 9/2022 | G01S 5/0036 |
| WO | WO-2022206794 | A1 | * | 10/2022 | H04L 5/0098 |
| WO | WO-2023055275 | A1 | * | 4/2023 | H04W 74/0816 |
| WO | WO-2024019887 | A1 | * | 1/2024 | H04W 64/00 |

OTHER PUBLICATIONS

Vivo, "Views on Nr Dl&Ul positioning techniques", 3GPP TSG RAN WG1#96 Meeting R1-1901716, Feb. 25-Mar. 1, 2019, pp. 1-5.
Nokia et al., "DL based NR positioning", 3GPP TSG RAN WG1 #96 R1-1901847, Feb. 25-Mar. 1, 2019, pp. 1-5.
Mitsubishi Electric, "Views on DL and UL positioning techniques", 3GPP TSG RAN WG1 Meeting #96 R1-1902836, Feb. 25-Mar. 1, 2019, pp. 1-3.
ZTE, "Discussion on PDCCH-based power saving signal", 3GPP TSG RAN WG1 #99 R1-1911925, Nov. 18-22, 2019, pp. 1-12.
Huawei et al., "Discussion of positioning enhancement", 3GPP TSG RAN WG1 Meeting #101-e R1-2003297, May 25-Jun. 5, 2020, pp. 1-8.
Intel Corp., "Potential Enhancements for NR Positioning", 3GPP TSG RAN WG1 Meeting #101-E R1-2003769, May 25-Jun. 5, 2020, pp. 1-7.
Xiaomi Comm., "Positioning enhancements for RRC Idle and RRC Inactive state UE", 3GPP TSG RAN WG1 #101 R1-2003977, May 25-Jun. 5, 2020, pp. 1-3.
LG Electronics, "Discussion on potential positioning enhancements", 3GPP TSG RAN WG1 #101-e R1-2004142, May 25-Jun. 5, 2020, pp. 1-9.
Qualcomm Inc., "Initial thoughts on Potential Positioning Enhancements", 3GPP TSG RAN WG1 #101-e R1-2004492, May 25-Jun. 5, 2020, pp. 1-14.
Qualcomm Inc., "New SID on NR Positioning Enhancements", 3GPP TSG RAN Meeting #86 RP-193237, Dec. 9-12, 2019, pp. 1-4.
CATT, "Summary of UE Power Saving in NR", 3GPP TSG RAN Meeting #88-e RP-200912, Jun. 29-Jul. 3, 2020, pp. 1-3.
3GPP, "3rd Generation Partnership Project; Technical Specification Group Radio Access Network; NR; Study on User Equipment (UE) power saving in NR (Release 16)", 3GPP TR 38.840 V16.0.0, Jun. 2019, pp. 1-74.
3GPP, "3rd Generation Partnership Project; Technical Specification Group Radio Access Network; Study on NR positioning support (Release 16)", 3GPP TR 38.855 V16.0.0, Mar. 2019, pp. 1-197.
3GPP, "3rd Generation Partnership Project; Technical Specification Group Radio Access Network; Study on channel model for frequencies from 0.5 to 100 GHz (Release 16)", 3GPP TR 38.901 V16.1.0, Dec. 2019, pp. 1-101.
3GPP, "3rd Generation Partnership Project; Technical Specification Group Services and System Aspects; Service requirements for cyber-physical control applications in vertical domains; Stage 1 (Release 17)", 3GPP TS 22.104 V17.2.0, Dec. 2019, pp. 1-76.
3GPP, "3rd Generation Partnership Project; Technical Specification Group Services and System Aspects; Service requirements for the 5G system; Stage 1 (Release 17)", 3GPP TS 22.261 V17.2.0, Mar. 2020, pp. 1-83.
3GPP, "3rd Generation Partnership Project; Technical Specification Group Radio Access Network; LTE Positioning Protocol (LPP) (Release 16)", 3GPP TS 37.355 V16.0.0, Mar. 2020, pp. 1-281.
3GPP, "3rd Generation Partnership Project; Technical Specification Group Radio Access Network; NR; User Equipment (UE) radio transmission and reception; Part 1: Range 1 Standalone (Release 16)", 3GPP TS 38.101-1 V16.3.0, Mar. 2020, pp. 1-332.
3GPP, "3rd Generation Partnership Project; Technical Specification Group Radio Access Network; NR; Multiplexing and channel coding (Release 16)", 3GPP TS 38.212 V16.1.0, Mar. 2020, pp. 1-146.
3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.
3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.
3GPP, "3rd Generation Partnership Project; Technical Specification Group Radio Access Network; NR; Physical layer measurements (Release 16)", 3GPP TS 38.215 V16.1.0, Mar. 2020, pp. 1-22.
3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.0.0, Mar. 2020, pp. 1-107.
3GPP, "3rd Generation Partnership Project; Technical Specification Group Radio Access Network; NR; Medium Access Control (MAC) protocol specification (Release 16)", 3GPP TS 38.321 V16.0.0, Mar. 2020, pp. 1-141.
3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

* cited by examiner

POSITIONING REFERENCE SIGNAL RESOURCE CONFIGURATION

CROSS-REFERENCE TO RELATED APPLICATIONS

This application claims priority to U.S. Patent Application Ser. No. 63/050,023 entitled "APPARATUSES, METHODS, AND SYSTEMS FOR POWER SAVING POSITIONING PROCEDURES IN A CARRIER AGGREGATION/DUAL-CONNECTIVITY SCENARIO" and filed on Jul. 9, 2020 for Robin Thomas, which is incorporated herein by reference in its entirety.

FIELD

The subject matter disclosed herein relates generally to wireless communications and more particularly relates to positioning reference signal resource configuration.

BACKGROUND

In certain wireless communications networks, excessive power may be used in positioning procedures. Such networks may inefficiently use resources based on a configuration.

BRIEF SUMMARY

Methods for positioning reference signal resource configuration are disclosed. Apparatuses and systems also perform the functions of the methods. One embodiment of a method includes receiving, at a location server, a discontinuous reception configuration of at least one user equipment. In some embodiments, the method includes transmitting a positioning reference signal resource configuration to the at least one user equipment based on the discontinuous reception configuration. The at least one user equipment uses the positioning reference signal resource configuration and the discontinuous reception configuration to perform positioning reference signal measurements.

One apparatus for positioning reference signal resource configuration includes a location server. In some embodiments, the apparatus includes a receiver that receives a discontinuous reception configuration of at least one user equipment. In various embodiments, the apparatus includes a transmitter that transmits a positioning reference signal resource configuration to the at least one user equipment based on the discontinuous reception configuration. The at least one user equipment uses the positioning reference signal resource configuration and the discontinuous reception configuration to perform positioning reference signal measurements.

Another embodiment of a method for positioning reference signal resource configuration includes receiving, at a user equipment, a positioning reference signal resource configuration at a user equipment. The positioning reference signal resource configuration is based on a discontinuous reception configuration. In some embodiments, the method includes performing positioning reference signal measurements based on the positioning reference signal resource configuration and the discontinuous reception configuration.

Another apparatus for positioning reference signal resource configuration includes a user equipment. In some embodiments, the apparatus includes a receiver that receives a positioning reference signal resource configuration at a user equipment. The positioning reference signal resource configuration is based on a discontinuous reception configuration. In various embodiments, the apparatus includes a processor that performs positioning reference signal measurements based on the positioning reference signal resource configuration and the discontinuous reception configuration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
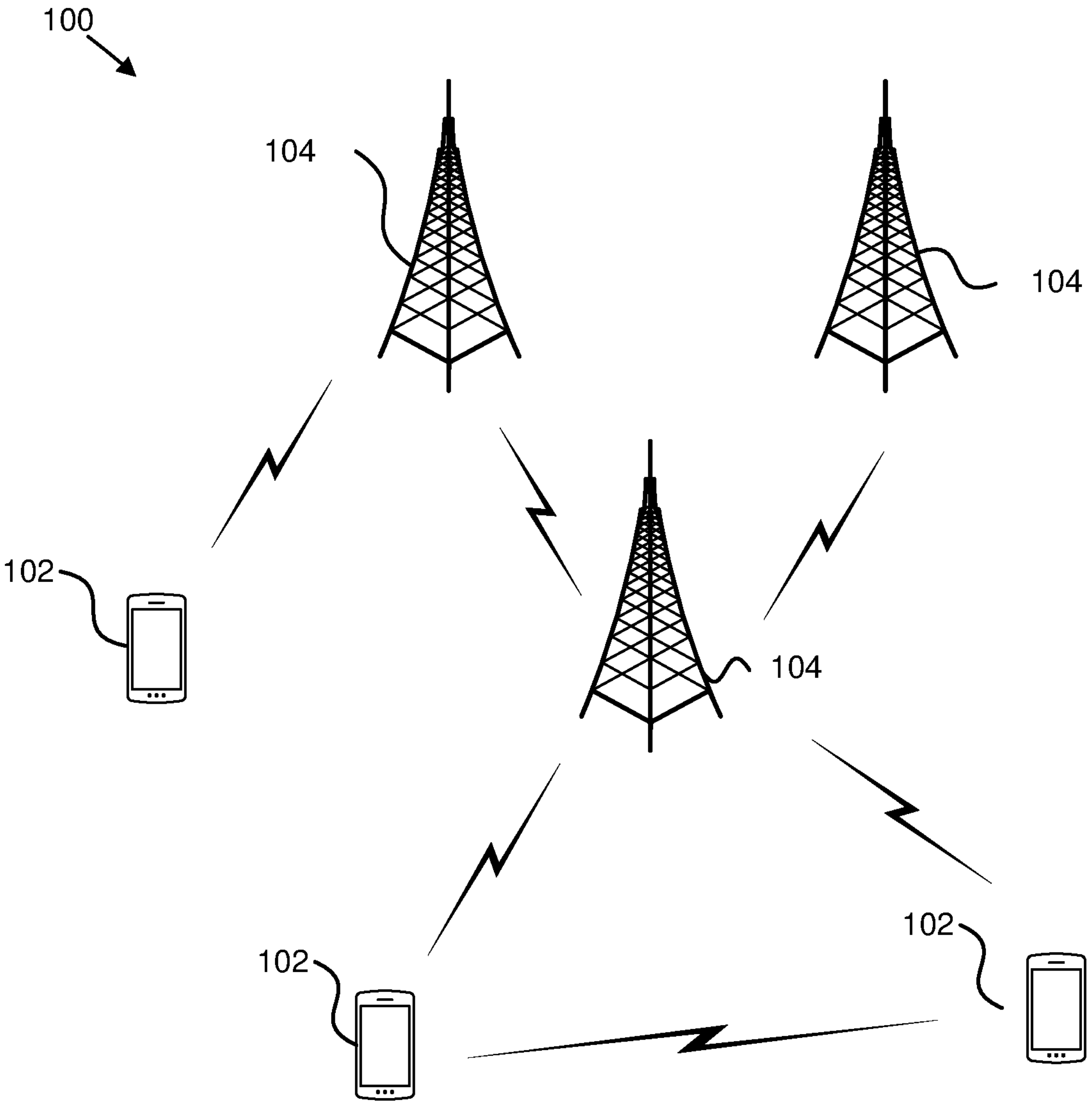
FIG. 1 is a schematic block diagram illustrating one embodiment of a wireless communication system for positioning reference signal resource configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for positioning reference signal resource configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee®, Sigfox®, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive, at a location server, a discontinuous reception configuration of at least one user equipment. In some embodiments, the network unit 104 may transmit a positioning reference signal resource configuration to the at least one user equipment based on the discontinuous reception configuration. The at least one user equipment uses the positioning reference signal resource configuration and the discontinuous reception configuration to perform positioning reference signal measurements. Accordingly, the network unit 104 may be used for positioning reference signal resource configuration.

In certain embodiments, a remote unit 102 may receive, at a user equipment, a positioning reference signal resource configuration at a user equipment. The positioning reference signal resource configuration is based on a discontinuous reception configuration. In some embodiments, the remote unit 102 may perform positioning reference signal measurements based on the positioning reference signal resource configuration and the discontinuous reception configuration. Accordingly, the remote unit 102 may be used for positioning reference signal resource configuration.

Figure 2:
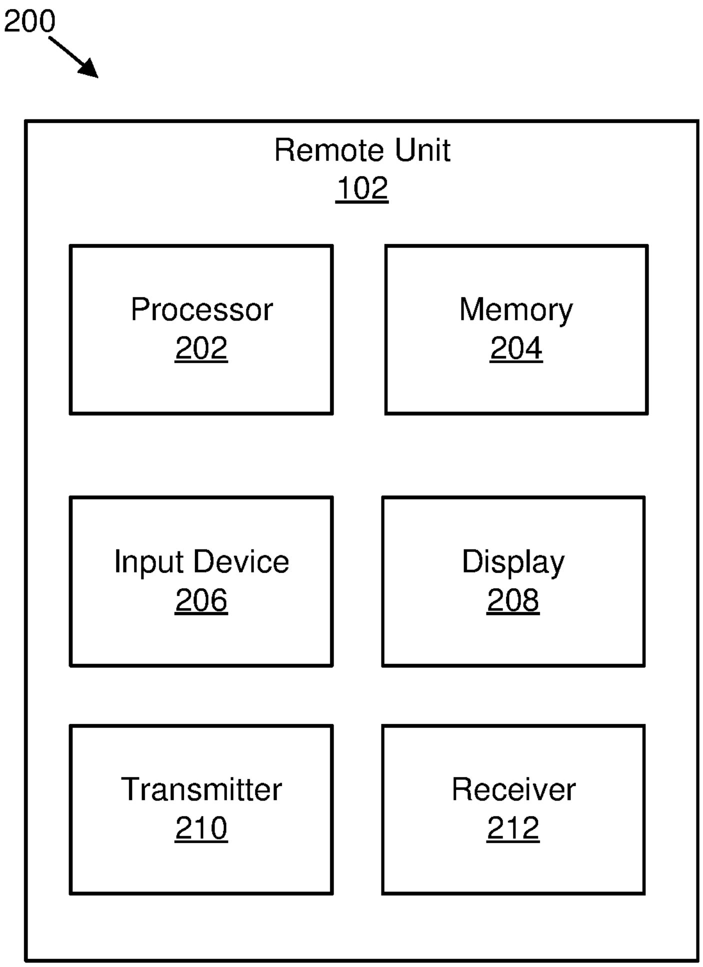
FIG. 2 is a schematic block diagram illustrating one embodiment of an apparatus that may be used for positioning reference signal resource configuration.

FIG. 2 depicts one embodiment of an apparatus 200 that may be used for positioning reference signal resource configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In some embodiments, the receiver 212 may receive a positioning reference signal resource configuration at a user equipment. The positioning reference signal resource configuration is based on a discontinuous reception configuration. In various embodiments, the processor 202 may perform positioning reference signal measurements based on the positioning reference signal resource configuration and the discontinuous reception configuration.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
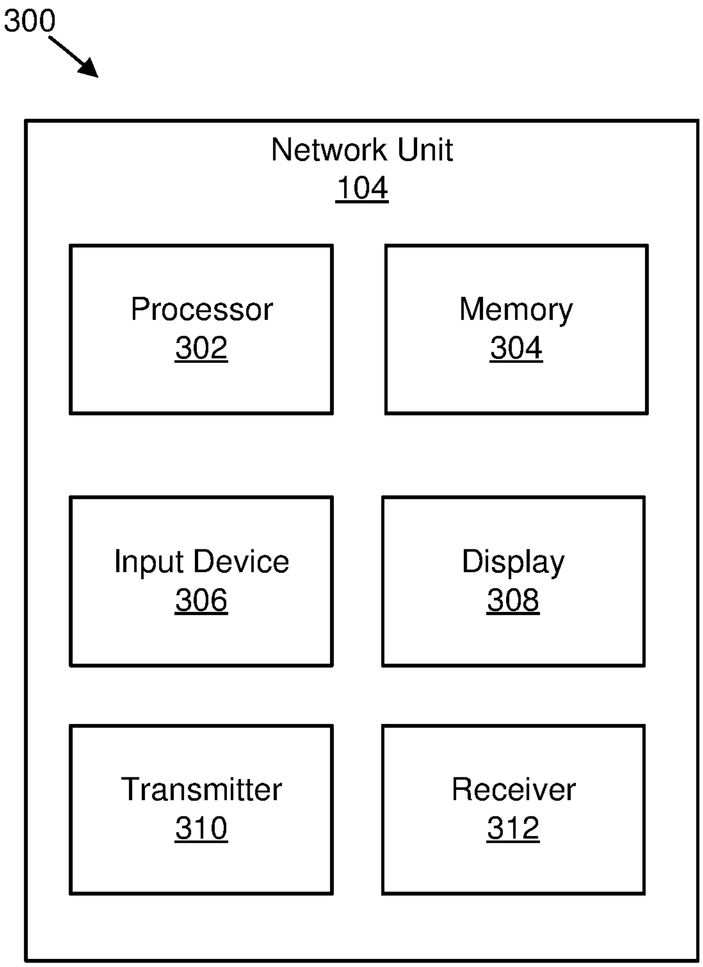
FIG. 3 is a schematic block diagram illustrating one embodiment of an apparatus that may be used for positioning reference signal resource configuration.

FIG. 3 depicts one embodiment of an apparatus 300 that may be used for positioning reference signal resource configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 may receive a discontinuous reception configuration of at least one user equipment. In various embodiments, the transmitter 310 may transmit a positioning reference signal resource configuration to the at least one user equipment based on the discontinuous reception configuration. The at least one user equipment uses the positioning reference signal resource configuration and the discontinuous reception configuration to perform positioning reference signal measurements.

In certain embodiments, target device and/or user equipment ("UE") radio access technology ("RAT") dependent positioning using new radio ("NR") technology may be used. In such embodiments, the positioning features may include fifth generation core network ("5GC") architectural and interface enhancements, as well as radio access node ("RAN") functionality that supports physical layer, layer-2 ("L2"), and/or layer-3 ("L3") signaling procedures to enable RAT-dependent NR positioning. In some embodiments, NR RAT-dependent positioning may be used for carrier aggregation and dual-connectivity configurations.

In various embodiments, for certain NR and LTE RAT-dependent positioning techniques, an amount of available bandwidth may impose limits on an upper bound of an achievable location accuracy. In certain embodiments, carrier aggregation ("CA") may be used in LTE and NR and may enable UE transmission and/or reception using multiple carriers from the same base station to exploit overall larger bandwidths for higher data rates per link, and may improve positional accuracy performance. Moreover, in some embodiments, dual connectivity ("DC") enables UE transmission and/or reception using multiple carriers from two cell groups (e.g., master and secondary cell groups). In various embodiments, layer-1 ("L1") and L2 configurations that enable CA and DC may be energy consuming, especially for positioning UEs with power limitations (e.g., internet of things ("IoT") UEs which rely on batteries for long term usage) with adaptive positioning accuracy requirements.

In certain embodiments, there may be enhancements to configurations to perform energy efficient positioning in CA and DC embodiments. Reducing energy consumption in such embodiments may prolong a UE's battery life while exploiting the benefits of higher overall bandwidths for higher location accuracy.

In some embodiments, a UE may be enabled to perform energy efficient positioning reference signal ("PRS") measurements using aggregated bandwidths from different carriers in a primary cell ("PCell") and secondary cells ("SCells") for higher accuracy based on a UE's discontinuous reception ("DRX") and wake-up signal ("WUS") configuration. In various embodiments, alignment may be enabled between a UE and/or group of UEs DRX configuration and PRS measurement configuration corresponding to a particular positioning technique for optimal transmission of the PRS resources to the UE and/or group of UEs applicable to a single carrier configuration and/or multi-carrier configuration.

In certain embodiments, there may be an energy efficient positioning method to exploit a WUS configuration for receiving required PRS resources in a carrier aggregation and/or dual-connectivity configuration corresponding to a PCell and SCell configuration. In some embodiments, there may be a method for a location server to provide a configuration of a carrier aggregated PRS measurement configuration to a UE based on configured NR RAT-dependent positioning methods for enhanced UE location accuracy.

In various embodiments, a location management function ("LMF") awareness of a UE's DRX configuration may facilitate optimizing PRS resource transmission to the UE for energy efficient positioning. This will enable the LMF to provide energy efficient assistance data including PRS measurement configurations to the UE based on the UE's current DRX configuration.

In certain embodiments, exploiting a WUS mechanism may enable energy efficient positioning within a CA scenario by allowing power-limited UEs to reap the benefits of larger overall bandwidths for enhanced accuracy. In some embodiments, aggregated bandwidths from different frequency carriers may enhance an overall UE positioning estimate in certain RAT-dependent positioning methods. In various embodiments, an energy efficient approach may enable a UE the flexibility to receive a PRS resource configuration based on a PCell and SCell indication.

In some embodiments, a capability to perform energy efficient positioning may be advantageous for devices with power constraints (e.g., limited and/or no access to a fixed power supply, small form factors, and based on target accuracy). In such embodiments, this may be especially useful for devices in an IoT environment where device battery life is an important design consideration. In various embodiments, a UE operating in a radio resource control ("RRC") connected ("CONNECTED") ("RRC_CONNECTED") state for extended periods of time without any ongoing data transmissions or measurements to be performed may be inefficient in terms of energy consumption. In certain embodiments, there may be no mechanisms for a UE to perform energy efficient PRS measurements in a carrier aggregated and/or dual connectivity configuration with a required accuracy. Such embodiments may be resolved by other embodiments described herein while performing UE-based RAT-dependent positioning. As may be appreciated, any of the embodiments described herein may be combined together.

In a first embodiment, a LMF's adapted PRS measurement configuration may be based on a UE's and/or a group of UEs' DRX configuration. In such embodiments, a serving gNB may provide the UE's and/or the group of UEs' DRX configuration to the LMF via an NR positioning protocol annex ("NRPPa") interface to better align and optimize transmission of the PRS measurement configuration for the UE and/or group of UEs to perform energy efficient PRS transmission and/or measurement and positioning report transmission. As may be appreciated, this may be applicable to both a single carrier and multi-carrier (e.g., carrier aggregation) UE positioning configurations.

In one embodiment of the first embodiment, a serving gNB may share a UE's and/or group of UEs' DRX configuration with the LMF via the NRPPa interface in addition to the PRS resource configurations to be configured for a positioning technique. The LMF may configure and provide the UE with assistance data containing the PRS resource configurations according to the DRX configuration of the UE and/or group of UEs to perform energy efficient PRS transmission and/or measurement and positioning report transmission. The PRS configuration may include a number of resources, a periodicity, a comb-pattern, and/or a muting pattern to align with an RRC CONNECTED DRX configuration and/or an RRC idle ("IDLE") ("RRC_IDLE") DRX configuration of the one or more UEs. The LMF may provide the DRX-based PRS configuration via an LTE positioning protocol ("LPP") for RRC_CONNECTED UEs and/or via system information broadcast for UEs in an RRC_IDLE and/or RRC inactive ("INACTIVE") ("RRC_INACTIVE") mode.

In another embodiment of the first embodiment, the gNB may modify the UE's and/or group of UE's DRX configuration based on an assistance request by a UE and/or group of UEs corresponding to a positioning technique. Depending on a number of UEs, there may be a group specific DRX configuration for receiving a PRS transmission.

In some embodiments of the first embodiment, the LMF may additionally provide a new DRX configuration along with the PRS resource configuration to a UE and/or group of UEs and may share this configuration with neighboring gNBs (e.g., gNBs contained within the same system information area or RAN notification area) to perform energy efficient PRS transmission and measurement. The DRX configuration provided by the LMF may be a UE specific configuration or a group specific configuration depending on whether the PRS transmission and measurement configuration is point-to-point, point-to-multipoint, or multipoint-to-multipoint (e.g., multiple gNBs transmitting PRS).

In various embodiments of DRX configurations, PRS and data and/or control channel transmission and/or reception may be multiplexed in a time domain manner so that a UE may receive PRS in a first slot and data and/or control channel in a second slot where PRS is not scheduled to be transmitted. The data and/or control information multiplexing may be performed in a manner to avoid interference with the PRS. In certain embodiments, a new DRX configuration only for PRS transmission and report transmission may be provided, where a UE does not need to monitor other data and/or control channel transmissions and contains few network configured timers (e.g., like on-duration), a slot offset containing a starting slot of on-duration, and/or a configuration for positioning reporting. In some embodiments, a DRX configuration contains an indication to provide information to a UE and/or a group of UEs about whether the UE and/or the group of UEs should monitor only PRS transmission, PRS transmission as well as data and/or control channel transmission, or only data and/or control channel transmissions. In various embodiments, a new DRX configuration contains a bit to indicate whether UEs expect to receive a PRS transmission along with the data and/or control channel.

In certain embodiments, a LMF in coordination with a base station may configure a single positioning method and/or multiple positioning method via multiple carriers based on different DRX groups associated with each carrier. In such embodiments, the LMF may configure assistance data for a single positioning method and/or multiple positioning method using a carrier in frequency range 1 ("FR1") based on a primary DRX configuration and on another carrier in frequency range 2 ("FR2") using a secondary DRX configuration. This may ensure that the corresponding PRS transmissions are aligned based on the DRX configuration of each carrier. In some embodiments, different DRX groups may be configured separately for a master node and a secondary node so that their corresponding PRS transmissions may be aligned.

In various embodiments related to a CA scenario, a gNB and a LMF may exchange carrier related information based on a required accuracy by a positioning application and/or service. In such embodiments, the carrier related information may include an indication that may be an index containing a required number of carriers, an amount of bandwidth per carrier to jointly achieve a particular positioning accuracy and shown in Table 1.

TABLE 1

LMF carrier-to-accuracy mapping indication

| CA Config | Required Number of Carriers | Bandwidth ("BW") (MHz) per Carrier | Required Location Estimate Accuracy (m) |
|---|---|---|---|
| 1 | 2 | Carrier 1 BW-15<br>Carrier 2 BW-15 | 10 |
| 2 | 3 | Carrier 1 BW-100<br>Carrier 2 BW-100<br>Carrier 3 BW-100 | 1 |
| 3 | 3 | Carrier 1 BW-900<br>Carrier 2 BW-900<br>Carrier 3 BW-900 | 0.11 |

In certain embodiments, as noted in Table 1, an accuracy increases depending on an amount of bandwidth required for each carrier. In such embodiments, a gNB may determine a physical resource availability in each recommended carrier. In some embodiments, a gNB may provide an exhaustive list of available carriers and bandwidth availability to an LMF for the LMF to determine a closest achievable accuracy with respect to a positioning application and/or service. In such embodiments, the LMF may semi-statically configure each UE and/or group of UEs or broadcast the list of carriers to all UEs for receiving PRS.

In various embodiments, a gNB may semi-statically configure each UE with a subset of carriers and with information to receive PRS (e.g., a subset from LMF configured carriers) along with an aligned DRX configuration depending on a needed positioning accuracy of a UE.

In a second embodiment, there may be application of a WUS and a DRX configuration to receive a PRS configuration in a PCell of a dual-connectivity configuration.

The second embodiment may deal with a configuration in which a DRX configured UE may receive indications of positioning-related transmissions and/or control and/or scheduled data transmissions from the PCell and/or special cell ("SpCell") in a next active period. More specifically, downlink control information ("DCI") WUS signaling that is monitored outside of a DRX active time of a UE may indicate whether a UE and/or group of UEs is expected to receive PRS and may indicate corresponding carriers of the PCell and/or SpCell in a next occurrence of the active period (e.g., DRX onDuration) based on a needed positioning accuracy for the UE and/or group of UEs.

In certain embodiments, an LMF, in coordination with a serving gNB, may include a location of a PRS indication bit for a PCell and/or SpCell (e.g., using signaling in a DCI format such as DCI format 2_6) which may be semi-statically configured per UE by a high layer parameter using LPP or RRC signaling or else is for a group of UEs. The PRS indication bit may covey whether the PCell is configured for PRS transmission (e.g., using a physical downlink shared channel ("PDSCH")) in a next active period, where: 1) the UE may not expect PRS transmissions for a next long DRX cycle if a value of the PRS indication bit is '0'; and 2) the UE may expect PRS transmissions for the next long DRX cycle if a value of the PRS indication bit is '1'.

In some embodiments, an LMF may configure a separate DCI-WUS configuration (e.g., a new DCI format that is monitored outside of an active time of a UE) in coordination with a serving and neighboring gNBs to receive only PRS transmissions (e.g., PRS resource configurations). In such embodiments, a new DCI size may be signaled to the UE by higher layer signaling using LPP or RRC signaling, and a location of a PRS indication bit in a DCI format may be semi-statically configured per UE by a high layer parameter or else the indication may be for a group of UEs.

In various embodiments, a UE may not be expected to monitor a physical downlink control channel ("PDCCH") if DCI outside an active period indicates that only PRS-related transmissions will be received by the UE and/or if any measurements need to be performed for the next on duration.

In certain embodiments, DCI-WUS signaling that is monitored outside a DRX active time of a UE and/or group of UEs may indicate whether a new PRS transmission may be received and measurements should be performed in the next active period using a 2-bit PRS indication according to Table 2.

TABLE 2

2-bit PRS indication

| PRS Indication | State Description |
|---|---|
| 00 | The UE may not expect to receive new PRS transmissions and may not have to perform positioning-related measurement(s) for the next long DRX cycle |
| 01 | The UE may not expect to receive new PRS transmissions and may have to perform positioning-related measurements for the next long DRX cycle based on previously configured PRS measurement |
| 10 | The UE may expect to receive a new PRS transmissions and may not have to perform positioning-related measurement(s) for the next long DRX cycle. |

TABLE 2-continued

| 2-bit PRS indication | |
|---|---|
| PRS Indication | State Description |
| 11 | The UE may expect to receive a new PRS transmissions and may have to perform corresponding positioning-related measurement(s) for the next long DRX cycle |

In some embodiments, a DCI-WUS field indicates whether a UE monitors PRS only, PDCCH and/or PDSCH plus PRS, or PDCCH and/or PDSCH within a next active period and whether the UE is expected to receive PRS and PDCCH and/or PDSCH in the same slot.

In various embodiments, a DCI-WUS field contains PRS monitoring occasions in terms of time slot within a next active period. If a UE is configured to monitor DCI-WUS before an active period of the UE, but the UE did not decode DCI-WUS before the start of the active period, then the UE wakes up to receive PRS, PDCCH, and/or PDSCH in a set of carriers of PCell and/or SpCell based on a semi-static configuration provided by a gNB.

In a third embodiment, there may be a WUS and DRX configuration to receive PRS configurations in one or more SCell groups of a dual-connectivity configuration. In such an embodiment, if a UE has been configured with DRX on a PCell or on a SpCell, a network may enable dormancy behavior of SCells in a next active period, depending on which groups of SCell carriers the UE is expected to receive positioning measurement configurations, perform the requested measurements and transmit the measurement report (e.g., for UE-assisted positioning) corresponding to a particular positioning technique. In such embodiments, the dormancy behavior may be implemented on a bandwidth part ("BWP") level corresponding to the active DL BWP, where the PRS measurement configuration is to be received by the UE. The UE may receive the PRS measurement configuration on a non-dormant BWP, while the PRS measurements may be performed on a dormant BWP. The reporting of the positioning measurements may have to be performed on a non-dormant active UL BWP.

In the third embodiment, a DCI-WUS signaling mechanism that is monitored outside an active period of a UE and/or group of UEs may be used. This may indicate whether a UE is expected to receive PRS-related configurations in a next occurrence of an active period for a group of configured SCells which include one or more dormant BWPs and one or more non-dormant BWPs for PRS reception and measurement. The indication of a group of configured SCells may be provided separately for PRS reception, PDCCH, and/or PDSCH if the location of the PRS indication bit, the PDCCH, and/or PDSCH may be semi-statically provided to the UE. In certain embodiments, the indication may be jointly provided for PRS, PDCCH, and/or PDSCH monitoring.

In some embodiments of the third embodiment, each group of SCells in a UE group (e.g., for non-dormant and/or dormant BWP) may be indicated using a bitmap in DCI, where each bit corresponds to one of the configured SCell groups, with most significant bit ("MSB") to least significant bit ("LSB") of the bitmap concatenated according to the SCell with a lowest to highest SCell group index. In various embodiments of the third embodiment, a most recent SCell configuration may be indicated by a MSB with an earliest SCell configuration indicated by a LSB.

In certain embodiments, a bitmap size may be equal to a number of groups of configured SCells where each bit of the bitmap corresponds to a group of configured SCells. In some embodiments, a '0' value for a bit of a bitmap indicates an active downlink ("DL") BWP provided by a higher-layer parameter (e.g., dormant-BWP), for a UE for each activated SCell in a corresponding group of configured SCells. In various embodiments, a '1' value for a bit of a bitmap indicates an active DL BWP provided by a higher-layer parameter (e.g., first-non-dormant-BWP-ID-for-DCI-outside-active-time) for a UE for each activated SCell in a corresponding group of configured SCells.

Figure 4:
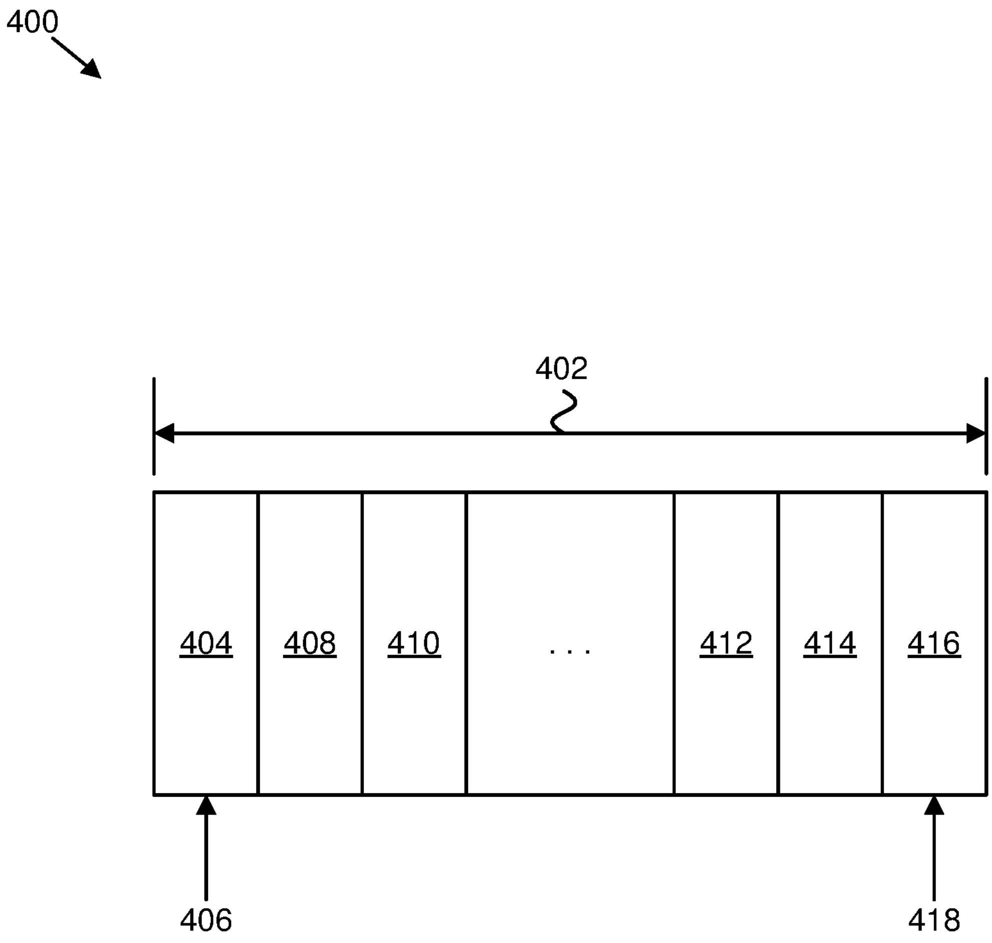
FIG. 4 is a schematic block diagram illustrating one embodiment of WUS PRS SCell dormancy indication.

FIG. 4 is a schematic block diagram 400 illustrating one embodiment of WUS PRS SCell dormancy indication. The schematic block diagram 400 illustrates a PRS SCell dormancy indication bitmap 402 having bits 404 (e.g., MSB 406, lowest SCell group index), 408, 410, 412, 424, and 416 (e.g., LSB 418, highest SCell group index). In some embodiments, a location of a PRS indication bit in a DCI format is semi-statically configured per UE by a high layer parameter or else the indication indication is for a group of UEs.

FIG. 4 shows the combined PCell and SCell PRS-related transmission WUS indication per UE described in the second embodiment and the third embodiment. This may be broadcast, in various embodiments, as a group configuration. In certain embodiments, a WUS indication described in the second embodiment may extend to a single carrier positioning configuration.

Figure 5:
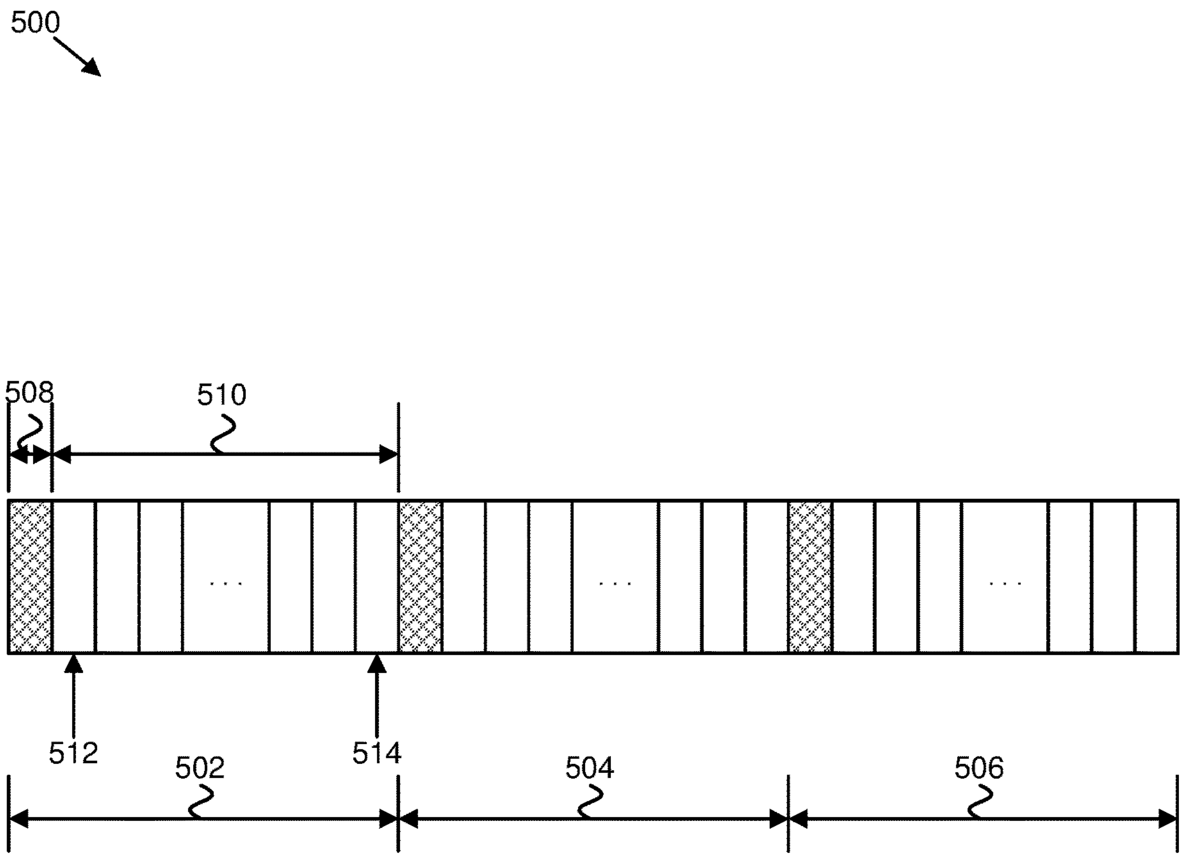
FIG. 5 is a schematic block diagram illustrating one embodiment of a combined PCell and SCell PRS WUS indication.

FIG. 5 is a schematic block diagram 500 illustrating one embodiment of a combined PCell and SCell PRS WUS indication. The schematic block diagram 500 illustrates the indication being for a first UE 502, a second UE 504, and a third UE 506. A set of bits for each of the first UE 502, the second UE 504, and the third UE 506 include a PRS PCell indication 508 (e.g., 1-bit, 2-bit), and a PRS SCell dormancy indication bitmap 510. The bits of the PRS SCell dormancy indication bitmap 510 include a MSB 512 (e.g., lowest SCell group index) and a LSB 514 (e.g., highest SCell group index).

In a fourth embodiment, a UE PRS measurement configuration may be applicable for CA and DC configurations.

In certain embodiments, the following CA configurations may be used: 1) intraband aggregation with a frequency-contiguous component carrier; 2) intraband aggregation with non-contiguous component carriers; and/or 3) interband aggregation with non-contiguous component carriers.

In some embodiments, to exploit larger bandwidths due to CA, a UE may be able to process a PRS measurement configuration received across different positioning frequency layers from multiple cells with a corresponding positioning technique. In such embodiments, a maximum of 4 separate positioning frequency layers may be configured by a LMF. In various embodiments, there may be mechanisms to enable a UE to receive a carrier aggregated PRS configuration in NR. For intraband contiguous carrier aggregation, the LMF may configure a carrier aggregation configuration via a PCell with associated bandwidth combination sets. The UE may indicate, via a message (e.g., ProvideCapabilities message) sent to the LMF, a number of supported bandwidth combination sets per carrier aggregation configuration. This may be triggered upon the UE receiving a message (e.g., a RequestCapabilities message) from the LMF. The same CA configuration may also apply for intraband non-contiguous CA and interband non-contiguous CA. In certain embodiments, due to simplicity in implementation, an intraband contiguous carrier aggregation configuration may be used but may be dependent on operator deployments.

Figure 6:
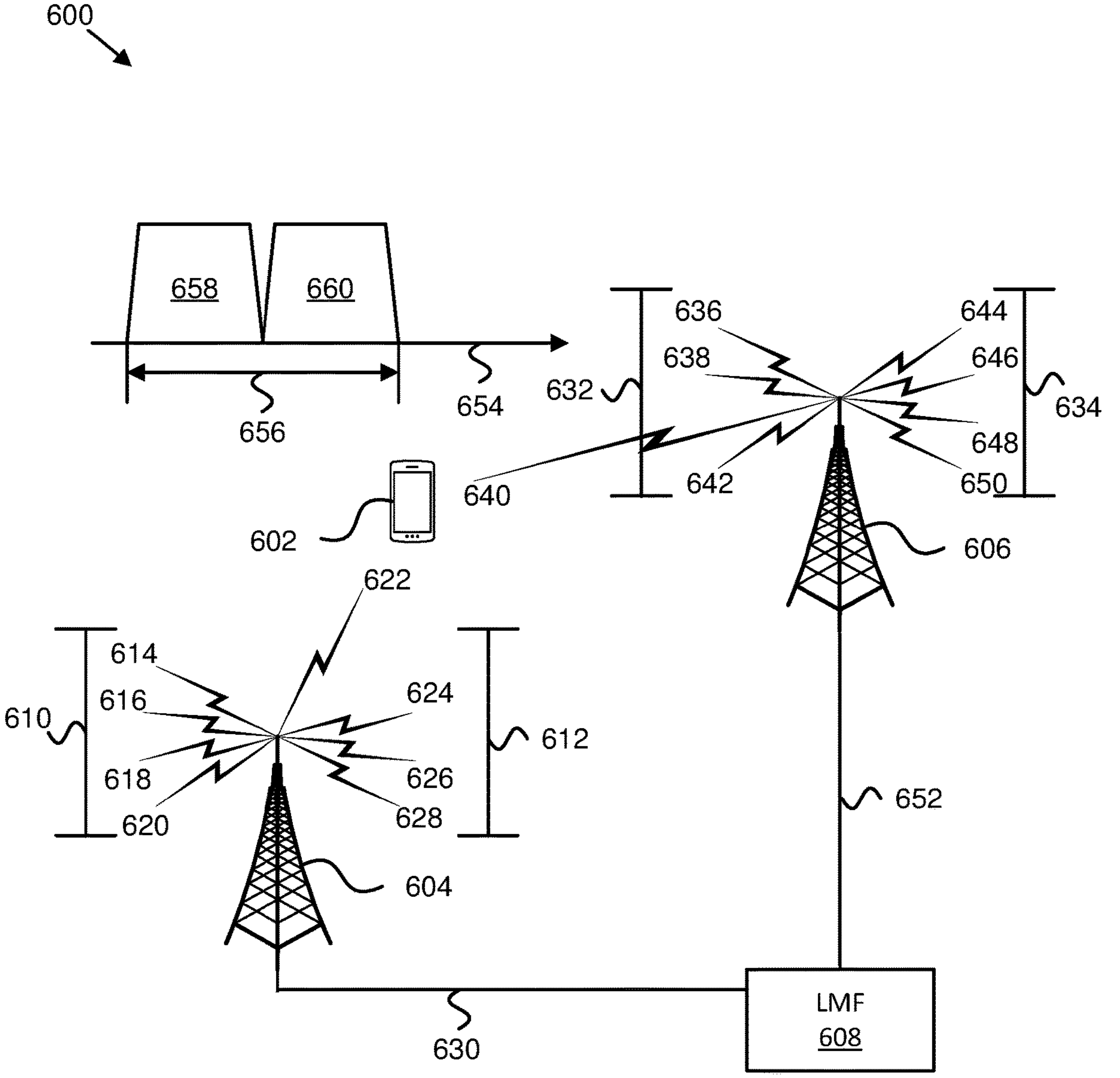
FIG. 6 is a schematic block diagram illustrating one embodiment of a system using intraband contiguous CA PRS configuration.

The fourth embodiment may use NR to NR dual connectivity ("NR-DC") where the UE performing positioning may be primarily connected to a gNB serving as master node ("MN") and another gNB serving as a secondary node ("SN"). This may be due to the fact that NR RAT-dependent positioning methods only support NR signals and not LTE signals. The MN and SN may transmit a set of PRS resources (e.g., PRS resource set and/or PRS resources) with a separate positioning frequency layer, which may be jointly measured and processed at the receiver side to exploit a larger overall bandwidth. FIG. 6 shows one illustration of joint processing of the PRS resources using an intraband contiguous CA configuration. It should be noted that the primary and secondary component carriers may be transmitted from the same gNB, which is different from the NR-DC embodiment illustrated in FIG. 6.

FIG. 6 is a schematic block diagram illustrating one embodiment of a system 600 using intraband contiguous CA (e.g., multi-carrier) PRS configuration. The system 600 includes a UE 602, a MN 604 (e.g., gNB 1, Pcell, reference), a SN 606 (e.g., gNB 2, Scell), and a LMF 608. The MN 604 includes a first set of resources 610 identified by a first resource set identifier ("ID") and a second set of resources 612 identified by a second resource set ID. Moreover, the first set of resources 610 includes a first PRS resource 614 having a first PRS resource ID, a second PRS resource 616 having a second PRS resource ID, a third PRS resource 618 having a third PRS resource ID, and an Nth PRS resource 620 having an Nth PRS resource ID. Further, the second set of resources 612 includes a first PRS resource 622 having a first PRS resource ID, a second PRS resource 624 having a second PRS resource ID, a third PRS resource 626 having a third PRS resource ID, and an Nth PRS resource 628 having an Nth PRS resource ID. The MN 604 may have a communication link 630 with the LMF 608.

The SN 606 includes a first set of resources 632 identified by a first resource set ID and a second set of resources 634 identified by a second resource set ID. Moreover, the first set of resources 632 includes a first PRS resource 636 having a first PRS resource ID, a second PRS resource 638 having a second PRS resource ID, a third PRS resource 640 having a third PRS resource ID, and an Nth PRS resource 642 having an Nth PRS resource ID. Further, the second set of resources 634 includes a first PRS resource 644 having a first PRS resource ID, a second PRS resource 646 having a second PRS resource ID, a third PRS resource 648 having a third PRS resource ID, and an Nth PRS resource 650 having an Nth PRS resource ID. The SN 606 may have a communication link 652 with the LMF 608.

A jointly processed PRS configuration 654 may be provided to the system 600 and may be configured over a first band 656. The jointly processed PRS configuration 654 may be a intraband contiguous PRS configuration having a first positioning frequency layer 658 (e.g., primary component layer corresponding to the first PRS resource 622) and a second positioning frequency layer 660 (e.g., secondary component layer corresponding to the third PRS resource 640).

In some embodiments, for each component carrier, if not configured with a measurement gap, a UE may measure a DL PRS within an active DL BWP and with the same numerology as the active DL BWP.

In various embodiments, for each component carrier, if configured with a measurement gap, a UE may measure a DL PRS resource outside of an active DL BWP or with a numerology different from a numerology of the active DL BWP if the measurement is made during a configured measurement gap.

In certain embodiments, a LMF, in coordination with an MN, may activate and/or deactivate different component carriers for joint DL processing of PRS resources according to: 1) a required accuracy determined by a positioning service; and 2) energy requirements of a UE (e.g., power consumption of the UE). As may be appreciated, this may apply to both UE-based and UE-assisted positioning methods. The MN or a SN may be configured by the LMF as a reference cell for timing-based positioning methods.

In various embodiments, a UE may need to report a carrier indication for an LMF to understand in which carrier the positioning measurements were performed. For example, the carrier indication may be included in measurement information ("NR-DL-TDOA-SignalMeasurementInformation") sent by the UE to the LMF and may include PCell and SCell group identifiers or a CA configuration identity associated with the measurements.

Figure 7:
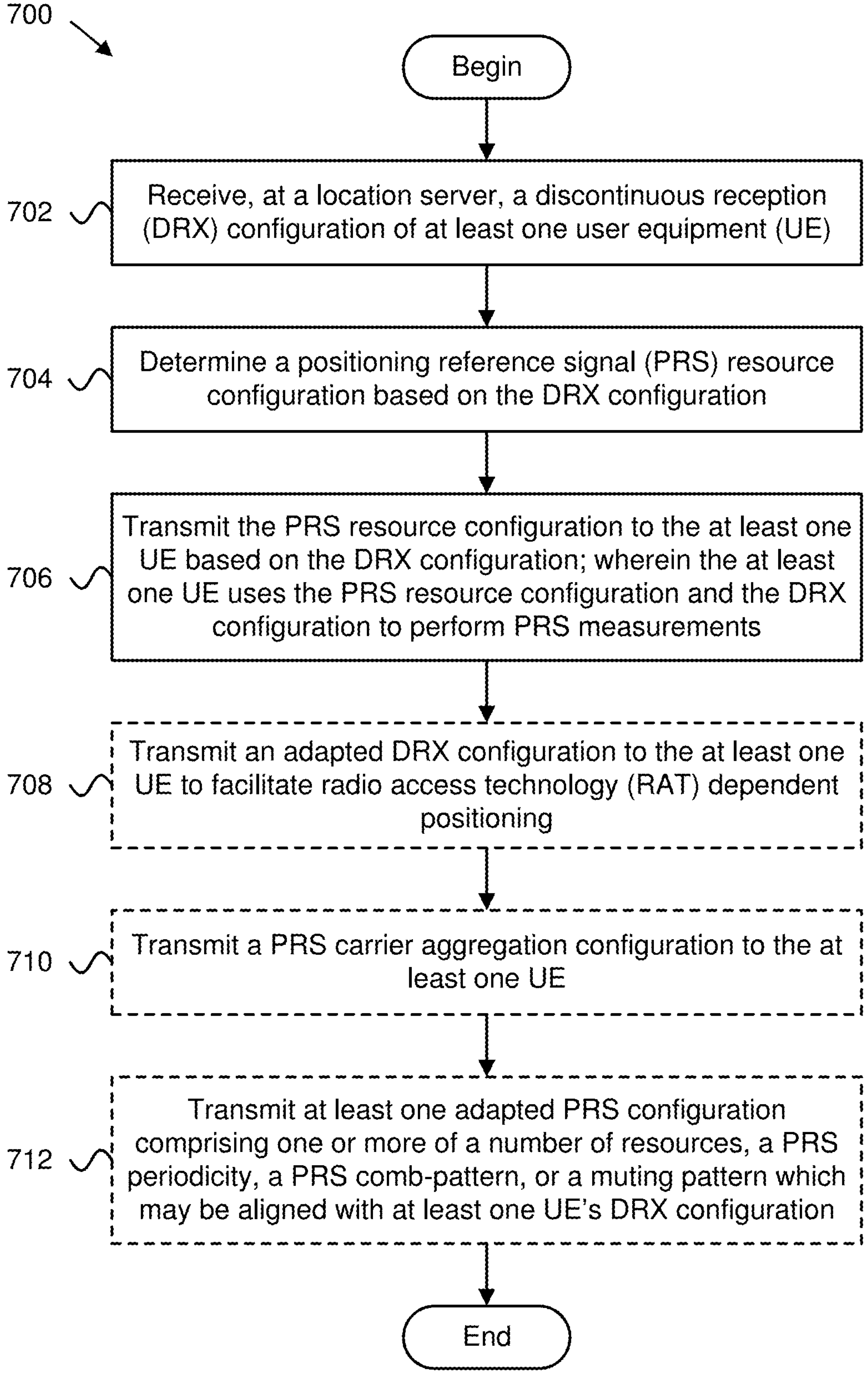
FIG. 7 is a flow chart diagram illustrating one embodiment of a method for positioning reference signal resource configuration.

FIG. 7 is a flow chart diagram illustrating one embodiment of a method 700 for positioning reference signal resource configuration. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes receiving 702, at a location server, a discontinuous reception (DRX) configuration of at least one user equipment (UE). In some embodiments, the method 700 includes determining 704 a positioning reference signal (PRS) resource configuration based on the DRX configuration. In some embodiments, the method 700 includes transmitting 706 a PRS resource configuration to the at least one UE based on the DRX configuration. The at least one UE uses the PRS resource configuration and the DRX configuration to perform PRS measurements.

In certain embodiments, the method 700 may further include transmitting 708 an adapted DRX configuration to the at least one UE to facilitate radio access technology (RAT) dependent positioning. In some embodiments, in response to the at least one UE being configured to perform RAT dependent positioning, the method 700 may further include transmitting 710 a PRS carrier aggregation configuration to the at least one UE. In various embodiments, the at least one UE uses the PRS carrier aggregation configuration to perform PRS measurements. In one embodiment, the PRS carrier aggregation configuration comprises intraband continuous component carriers, intraband non-contiguous carriers, or interband non-contiguous carriers.

In some embodiments, the method 700 may further include transmitting 712 at least one adapted PRS configuration comprising one or more of a number of resources, a PRS periodicity, a PRS comb-pattern, or a muting pattern which may be aligned with at least one UE's DRX configuration. In certain embodiments, the method 700 may further include processing the PRS measurements based on whether a measurement gap is configured. In some embodiments, the method 700 may further include exchanging carrier information with a base station, wherein the carrier information is based on an accuracy required by a positioning application, a positioning service, or a combination thereof. In various embodiments, the method 700 may further include receiving a report comprising a carrier indication to facilitate tracking carriers in which the PRS measurements are performed.

Figure 8:
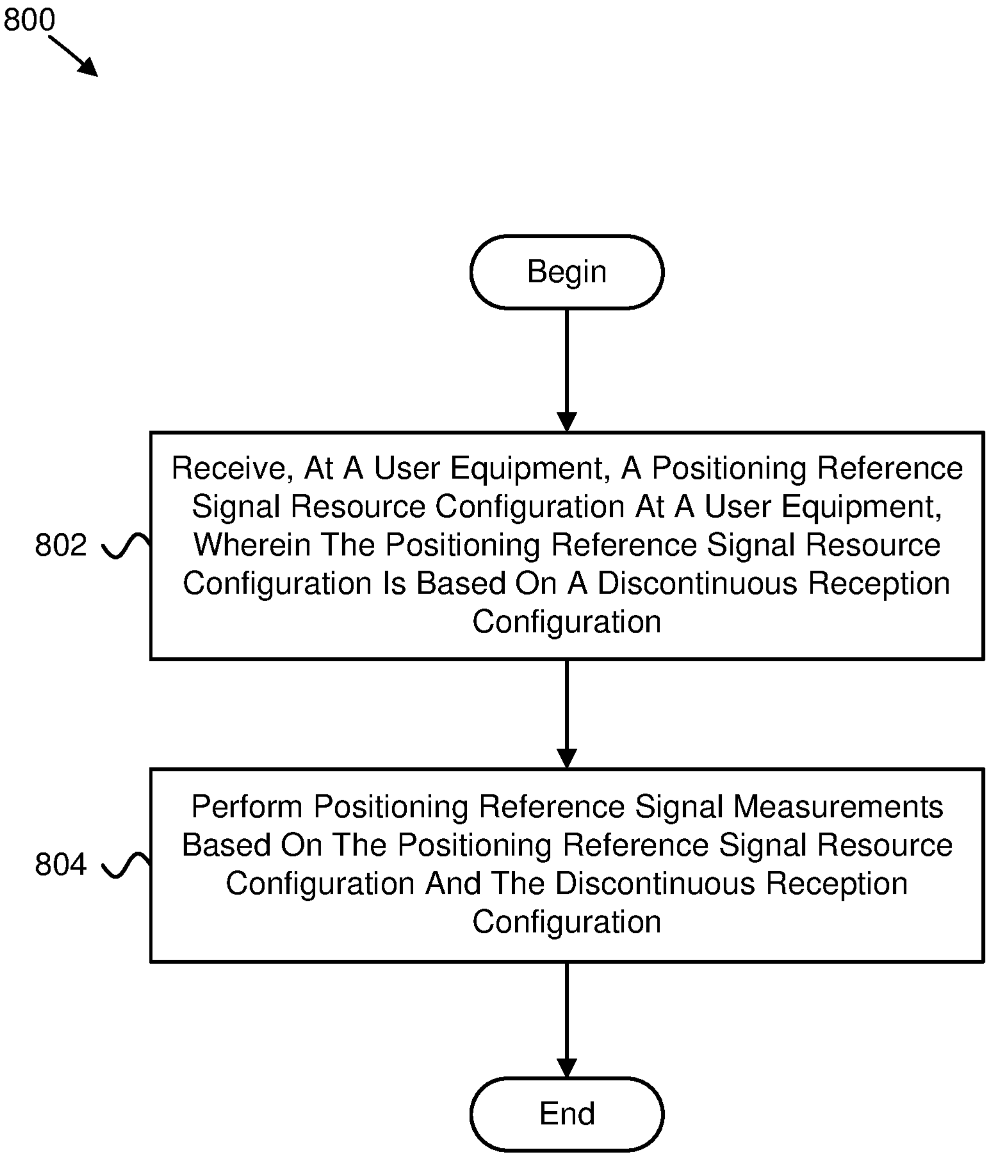
FIG. 8 is a flow chart diagram illustrating another embodiment of a method for positioning reference signal resource configuration.

FIG. 8 is a flow chart diagram illustrating another embodiment of a method 800 for positioning reference signal resource configuration. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802, at a user equipment, a positioning reference signal resource configuration at a user equipment. The positioning reference signal resource configuration is based on a discontinuous reception configuration. In some embodiments, the method 800 includes performing 804 positioning reference signal measurements based on the positioning reference signal resource configuration and the discontinuous reception configuration.

In certain embodiments, the method 800 further comprises receiving an adapted discontinuous reception configuration indicating to monitor a multiplexed positioning reference signal and data in a physical channel or only a positioning reference signal in the physical channel. In some embodiments, the method 800 further comprises, in response to the user equipment being configured to perform radio access technology dependent positioning, receiving a positioning reference signal carrier aggregation configuration. In various embodiments, the method 800 further comprises performing the positioning reference signal measurements and jointly processing the positioning reference signal measurements based on the positioning reference signal carrier aggregation configuration.

In one embodiment, the method 800 further comprises transmitting a report indicating positioning reference signal measurements, wherein the report comprises a carrier indication to facilitate tracking carriers in which the positioning reference signal measurements are performed. In certain embodiments, the method 800 further comprises receiving an indication bit indicating transmission of positioning reference signal measurements or non-transmission of the positioning reference signal measurement in the next occurrence of the active period. In some embodiments, the method 800 further comprises processing the positioning reference signal measurements based on whether a measurement gap is configured.

In one embodiment, a method comprises: receiving, at a location server, a discontinuous reception configuration of at least one user equipment; and transmitting a positioning reference signal resource configuration to the at least one user equipment based on the discontinuous reception configuration; wherein the at least one user equipment uses the positioning reference signal resource configuration and the discontinuous reception configuration to perform positioning reference signal measurements.

In certain embodiments, the method further comprises transmitting an adapted discontinuous reception configuration to the at least one user equipment to facilitate radio access technology dependent positioning.

In some embodiments, the method further comprises, in response to the at least one user equipment being configured to perform radio access technology dependent positioning, transmitting a positioning reference signal carrier aggregation configuration to the at least one user equipment.

In various embodiments, the at least one user equipment uses the positioning reference signal carrier aggregation configuration to perform positioning reference signal measurements.

In one embodiment, the positioning reference signal carrier aggregation configuration comprises intraband continuous component carriers, intraband non-contiguous carriers, or interband non-contiguous carriers.

In certain embodiments, the method further comprises processing the positioning reference signal measurements based on whether a measurement gap is configured.

In some embodiments, the method further comprises exchanging carrier information with a base station, wherein the carrier information is based on an accuracy required by a positioning application, a positioning service, or a combination thereof.

In various embodiments, the method further comprises receiving a report comprising a carrier indication to facilitate tracking carriers in which the positioning reference signal measurements are performed.

In one embodiment, an apparatus comprises a location server, the apparatus further comprising: a receiver that receives a discontinuous reception configuration of at least one user equipment; and a transmitter that transmits a positioning reference signal resource configuration to the at least one user equipment based on the discontinuous reception configuration; wherein the at least one user equipment uses the positioning reference signal resource configuration and the discontinuous reception configuration to perform positioning reference signal measurements.

In certain embodiments, the transmitter transmits an adapted discontinuous reception configuration to the at least one user equipment to facilitate radio access technology dependent positioning.

In some embodiments, the transmitter, in response to the at least one user equipment being configured to perform radio access technology dependent positioning, transmits a positioning reference signal carrier aggregation configuration to the at least one user equipment.

In various embodiments, the at least one user equipment uses the positioning reference signal carrier aggregation configuration to perform positioning reference signal measurements.

In one embodiment, the positioning reference signal carrier aggregation configuration comprises intraband continuous component carriers, intraband non-contiguous carriers, or interband non-contiguous carriers.

In certain embodiments, the apparatus further comprises a processor that processes the positioning reference signal measurements based on whether a measurement gap is configured.

In some embodiments, the transmitter and the receiver exchange carrier information with a base station, and the carrier information is based on an accuracy required by a positioning application, a positioning service, or a combination thereof.

In various embodiments, the receiver receives a report comprising a carrier indication to facilitate tracking carriers in which the positioning reference signal measurements are performed.

In one embodiment, a method comprises: receiving, at a user equipment, a positioning reference signal resource configuration at a user equipment. The positioning reference signal resource configuration is based on a discontinuous reception configuration; and performing positioning reference signal measurements based on the positioning reference signal resource configuration and the discontinuous reception configuration.

In certain embodiments, the method further comprises receiving an adapted discontinuous reception configuration indicating to monitor a multiplexed positioning reference signal and data in a physical channel or only a positioning reference signal in the physical channel.

In some embodiments, the method further comprises, in response to the user equipment being configured to perform radio access technology dependent positioning, receiving a positioning reference signal carrier aggregation configuration.

In various embodiments, the method further comprises performing the positioning reference signal measurements and jointly processing the positioning reference signal measurements based on the positioning reference signal carrier aggregation configuration.

In one embodiment, the method further comprises transmitting a report indicating positioning reference signal measurements, wherein the report comprises a carrier indication to facilitate tracking carriers in which the positioning reference signal measurements are performed.

In certain embodiments, the method further comprises receiving an indication bit indicating transmission of positioning reference signal measurements or non-transmission of the positioning reference signal measurement in the next occurrence of the active period.

In some embodiments, the method further comprises processing the positioning reference signal measurements based on whether a measurement gap is configured.

In one embodiment, an apparatus comprises a user equipment, the apparatus further comprising: a receiver that receives a positioning reference signal resource configuration at a user equipment. The positioning reference signal resource configuration is based on a discontinuous reception configuration; and a processor that performs positioning reference signal measurements based on the positioning reference signal resource configuration and the discontinuous reception configuration.

In certain embodiments, the receiver receives an adapted discontinuous reception configuration indicating to monitor a multiplexed positioning reference signal and data in a physical channel or only a positioning reference signal in the physical channel.

In some embodiments, the receiver, in response to the user equipment being configured to perform radio access technology dependent positioning, receives a positioning reference signal carrier aggregation configuration.

In various embodiments, the processor performs the positioning reference signal measurements and jointly processes the positioning reference signal measurements based on the positioning reference signal carrier aggregation configuration.

In one embodiment, the apparatus further comprises a transmitter that transmits a report indicating positioning reference signal measurements, wherein the report comprises a carrier indication to facilitate tracking carriers in which the positioning reference signal measurements are performed.

In certain embodiments, the receiver receives an indication bit indicating transmission of positioning reference signal measurements or non-transmission of the positioning reference signal measurement in the next occurrence of the active period.

In some embodiments, the processor processes the positioning reference signal measurements based on whether a measurement gap is configured.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a location server, the method comprising:

receiving a discontinuous reception (DRX) configuration and a carrier aggregation capability of at least one user equipment (UE); and determining a positioning reference signal (PRS) resource configuration based on the DRX configuration;

determining a PRS carrier aggregation configuration based on the carrier aggregation capability;

transmitting the PRS resource configuration and the PRS carrier aggregation configuration to the at least one UE;

wherein the at least one UE uses the PRS resource configuration and the DRX configuration to perform PRS measurements.

2. The method of claim 1, further comprising transmitting an adapted DRX configuration to the at least one UE to facilitate radio access technology (RAT) dependent positioning.

3. The method of claim 1, wherein the PRS carrier aggregation configuration is further based on the at least one UE being configured to perform radio access technology (RAT) dependent positioning.

4. The method of claim 1, wherein the at least one UE uses the PRS carrier aggregation configuration to perform the PRS measurements.

5. The method of claim 1, wherein the PRS carrier aggregation configuration comprises intraband continuous component carriers, intraband non-contiguous carriers, or interband non-contiguous carriers.

6. The method of claim 5, further comprising processing the PRS measurements based on whether a measurement gap is configured.

7. The method of claim 1, further comprising transmitting at least one adapted PRS configuration comprising one or more of a number of resources, a PRS periodicity, a PRS comb-pattern, or a muting pattern which may be aligned with at least one UE's DRX configuration.

8. The method of claim 1, further comprising receiving a report comprising a carrier indication to facilitate tracking carriers in which the PRS measurements are performed.

9. A location server, comprising:

at least one memory; and at least one processor coupled with the at least one memory and configured to cause the location server to:

receive a discontinuous reception (DRX) configuration and a carrier aggregation capability of at least one user equipment (UE);

determine a positioning reference signal (PRS) resource configuration based on the DRX configuration;

determine a PRS carrier aggregation configuration based on the carrier aggregation capability;

transmit the PRS resource configuration and the PRS carrier aggregation configuration to the at least one UE;

wherein the at least one UE uses the PRS resource configuration and the DRX configuration to perform PRS measurements.

10. A method performed by a user equipment (UE), the method comprising:

transmitting a carrier aggregation capability of the UE; and receiving a positioning reference signal (PRS) resource configuration and a PRS carrier aggregation configuration, wherein the PRS resource configuration is determined based on a discontinuous reception (DRX) configuration of the UE and wherein the PRS carrier aggregation configuration is determined based on the carrier aggregation capability; and performing PRS measurements based on the PRS resource configuration and the DRX configuration.

11. The method of claim 10, further comprising receiving an adapted DRX configuration indicating to monitor a multiplexed PRS and data in a physical channel or only a PRS in the physical channel.

12. The method of claim 10, wherein the PRS carrier aggregation configuration is further based on the UE being configured to perform radio access technology (RAT) dependent positioning.

13. The method of claim 10, wherein performing the PRS measurements is further based on the PRS carrier aggregation configuration, the method further comprising jointly processing the PRS measurements based on the PRS carrier aggregation configuration.

14. The method of claim 10, further comprising transmitting a report indicating PRS measurements, wherein the report comprises a carrier indication to facilitate tracking carriers in which the PRS measurements are performed.

15. The method of claim 10, further comprising receiving an indication bit indicating transmission of PRS measurements or non-transmission of the PRS measurement in the next occurrence of the active period.

16. The location server of claim 9, wherein the at least one processor is configured to cause the location server to transmit an adapted DRX configuration to the at least one UE to facilitate radio access technology (RAT) dependent positioning.

17. The location server of claim 9, wherein the PRS carrier aggregation configuration is further based on the at least one UE being configured to perform radio access technology (RAT) dependent positioning.

18. The location server of claim 9, wherein the at least one UE uses the PRS carrier aggregation configuration to perform the PRS measurements.

19. The location server of claim 9, wherein the PRS carrier aggregation configuration comprises intraband continuous component carriers, intraband non-contiguous carriers, or interband non-contiguous carriers.

20. The location server of claim 19, wherein the at least one processor is configured to cause the location server to process the PRS measurements based on whether a measurement gap is configured.

* * * * *